US009470185B2

(12) United States Patent
Dudar

(10) Patent No.: US 9,470,185 B2
(45) Date of Patent: Oct. 18, 2016

(54) ENGINE-OFF NATURAL VACUUM TESTING FOR VARIABLE DISPLACEMENT ENGINE VEHICLES

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 286 days.

(21) Appl. No.: 14/445,994

(22) Filed: Jul. 29, 2014

(65) Prior Publication Data

US 2016/0032872 A1 Feb. 4, 2016

(51) Int. Cl.
*G01M 15/00* (2006.01)
*F02M 25/08* (2006.01)

(52) U.S. Cl.
CPC ................................. *F02M 25/0809* (2013.01)

(58) Field of Classification Search
CPC ..................... F02M 25/0809; F02M 25/0818; E21B 47/1025; G01M 3/2853; G01M 3/2815; G01M 3/025
USPC ............... 73/114.69, 114.74, 114.38, 114.39, 73/40.5 R, 49.7
See application file for complete search history.

(56) References Cited

U.S. PATENT DOCUMENTS 6,089,081 A * 7/2000 Cook ................. F02M 25/0809 73/114.39
6,327,901 B1 * 12/2001 Dawson ............. F02M 25/0809 73/114.39
6,536,261 B1 * 3/2003 Weldon .............. F02M 25/0809 123/520
6,631,634 B2 * 10/2003 Cook ................. F02M 25/0809 73/114.38
6,640,620 B2 * 11/2003 Cook ................. F02M 25/0836 73/114.38
6,786,191 B2 9/2004 Foster
6,950,742 B2 * 9/2005 Yamaguchi ........... G01M 3/025 123/520
7,493,206 B2 2/2009 Lahti et al.
8,631,646 B2 1/2014 Smith et al.
2009/0293599 A1 * 12/2009 McLain ............. F02M 25/0827 73/114.39
2010/0064774 A1 * 3/2010 Drane .................. F02M 25/089 73/40
2013/0298643 A1 * 11/2013 Gearhart ................ G01M 3/04 73/40.5 R
2014/0074385 A1 3/2014 Dudar et al.
2014/0260549 A1 * 9/2014 Dudar .................. F02M 65/006 73/40
2015/0114089 A1 * 4/2015 Dudar ................ F02M 25/0809 73/40

OTHER PUBLICATIONS

Anonymous, "Evaluation of Equilibrium of Vapor (EOEV) for Fuel Storage Leak Detection," IPCOM No. 000236096, Published Apr. 4, 2014, 2 pages.
Leone, T. G. et al., "Fuel Economy Benefit of Cylinder Deactivation—Sensitivity to Vehicle Application and Operating Constraints," SAE Technical Paper Series No. 2001-01-3591, International Fall Fuels and Lubricants Meeting and Exposition, San Antonio, TX., Sep. 24-27, 2001, 8 pages.
Deronne, Michael et al., "The Development and Implementation of an Engine Off Natural Vacuum Test for Diagnosing Small Leaks in Evaporative Emissions Systems," SAE Technical Paper Series No. 2003-01-0719, 2003 SAE World Congress, Detroit, MI., Mar. 3-6, 2003, 13 pages.

* cited by examiner

*Primary Examiner* — Hezron E Williams
*Assistant Examiner* — Truong Phan
(74) *Attorney, Agent, or Firm* — James Dottavio; Alleman Hall McCoy Russell & Tuttle LLP

(57) ABSTRACT

A method, comprising: adjusting an evaporative emissions leak test parameter based on a ratio of cylinder run time of a deactivatable cylinder of an engine, to vehicle run time; and indicating degradation based on the adjusted parameter. The adjusted parameter may thus more accurately reflect the state of a vehicle configured to run with one or more cylinders deactivated. In this way, the evaporative emissions leak test may realize improved robustness and performance metrics, thus reducing warranty costs associated with poor test metrics.

20 Claims, 5 Drawing Sheets

ENGINE-OFF NATURAL VACUUM TESTING FOR VARIABLE DISPLACEMENT ENGINE VEHICLES

BACKGROUND AND SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere.

Evaporative leaks may be identified using engine-off natural vacuum (EONV) during conditions when a vehicle engine is not operating. In particular, a fuel system may be isolated at an engine-off event. The pressure in such a fuel system will increase if the tank is heated further (e.g. from hot exhaust or a hot parking surface) as liquid fuel vaporizes. As a fuel tank cools down, a vacuum is generated therein as fuel vapors condense to liquid fuel. Vacuum generation is monitored and leaks identified based on expected vacuum development or expected rates of vacuum development.

For variable displacement engines (VDEs), or other engines configured to run with one or more cylinders deactivated, the engine may generate less heat during a vehicle run-time than for an engine that operates with all cylinders constantly active. However, the entry conditions and thresholds for a typical EONV test are based on an inferred amount of heat rejected into the fuel tank. The inferred amount of heat may be based on engine run-time, integrated mass air flow, etc. For VDEs, these indicators may thus overestimate the amount of heat generated by the engine. As such, an EONV test may be initiated even if the engine has minimal cylinder activation time, leading to aborted or indeterminate test results. Further, with a reduced amount of rejected heat, the fuel tank may fail to reach EONV test thresholds, leading to false failures even if the fuel system is intact.

The inventors herein have recognized the above issues and have developed systems and methods to at least partially address them. In one example, a method, comprising: adjusting an evaporative emissions leak test parameter based on a ratio of cylinder run time of a deactivatable cylinder of an engine, to vehicle run time; and indicating degradation based on the adjusted parameter. The adjusted parameter may thus more accurately reflect the state of a vehicle configured to run with one or more cylinders deactivated. In this way, the evaporative emissions leak test may realize improved robustness and performance metrics, thus reducing warranty costs associated with poor test metrics.

In another example, a vehicle system, comprising: an engine comprising one or more selectively operable cylinders; a fuel system isolatable from atmosphere via one or more valves; and a controller configured with instructions stored in non-transitory memory, that when executed, cause the controller to: adjust one or more thresholds for an engine-off natural vacuum test based on a ratio of cylinder run time to total vehicle run time; following a vehicle-off event, isolate the fuel system from atmosphere; and indicate degradation of the fuel system based on the one or more adjusted thresholds. Engines configured to run with one or more cylinders deactivated may generate less heat over the course of operation than do engines configured to run with all cylinders activated constantly. By adjusting thresholds for an engine-off natural vacuum test, the expected changes in fuel tank temperature and pressure may more accurately reflect the state of the engine and an expected amount of heat rejected to the fuel tank. In this way, false failures may be reduced by adjusting the expected resulting fuel tank pressure.

In yet another example, a method for a vehicle fuel system, comprising: adjusting a pressure rise threshold and a vacuum threshold for an engine-off natural vacuum test based on a ratio of cylinder run time to total vehicle run time; following a vehicle-off event, closing a canister vent valve responsive to the ratio of cylinder run time to total vehicle run time being greater than an initiation threshold; monitoring a fuel tank pressure for a first testing duration; responsive to a fuel tank pressure reaching the adjusted pressure rise threshold during the first testing duration, indicating that the vehicle fuel system is intact; responsive to a fuel tank pressure failing to reach the adjusted pressure rise threshold during the first testing duration, coupling the vehicle fuel system to atmosphere; responsive to the fuel tank pressure decreasing to atmospheric pressure, isolating the vehicle fuel system from atmosphere; monitor a fuel tank vacuum for a second testing duration; responsive to a fuel tank vacuum reaching the adjusted vacuum threshold during the second testing duration, indicate that the vehicle fuel system is intact; and indicating degradation of the vehicle fuel system responsive to the fuel tank vacuum failing to reach the adjusted vacuum threshold during the second testing duration. By initiating the EONV test only when the ratio of cylinder run time to total vehicle run time is greater than an initiation threshold, the execution rate of the test may be increased. In this way, the test may only be initiated when a threshold amount of rejected heat energy is inferred.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows an example layout of a variable displacement engine (VDE) system.

FIG. 2 schematically shows an partial engine view including an example engine cylinder.

FIG. 3 schematically shows a fuel system and emissions system for a vehicle engine.

DETAILED DESCRIPTION

Figure 3:
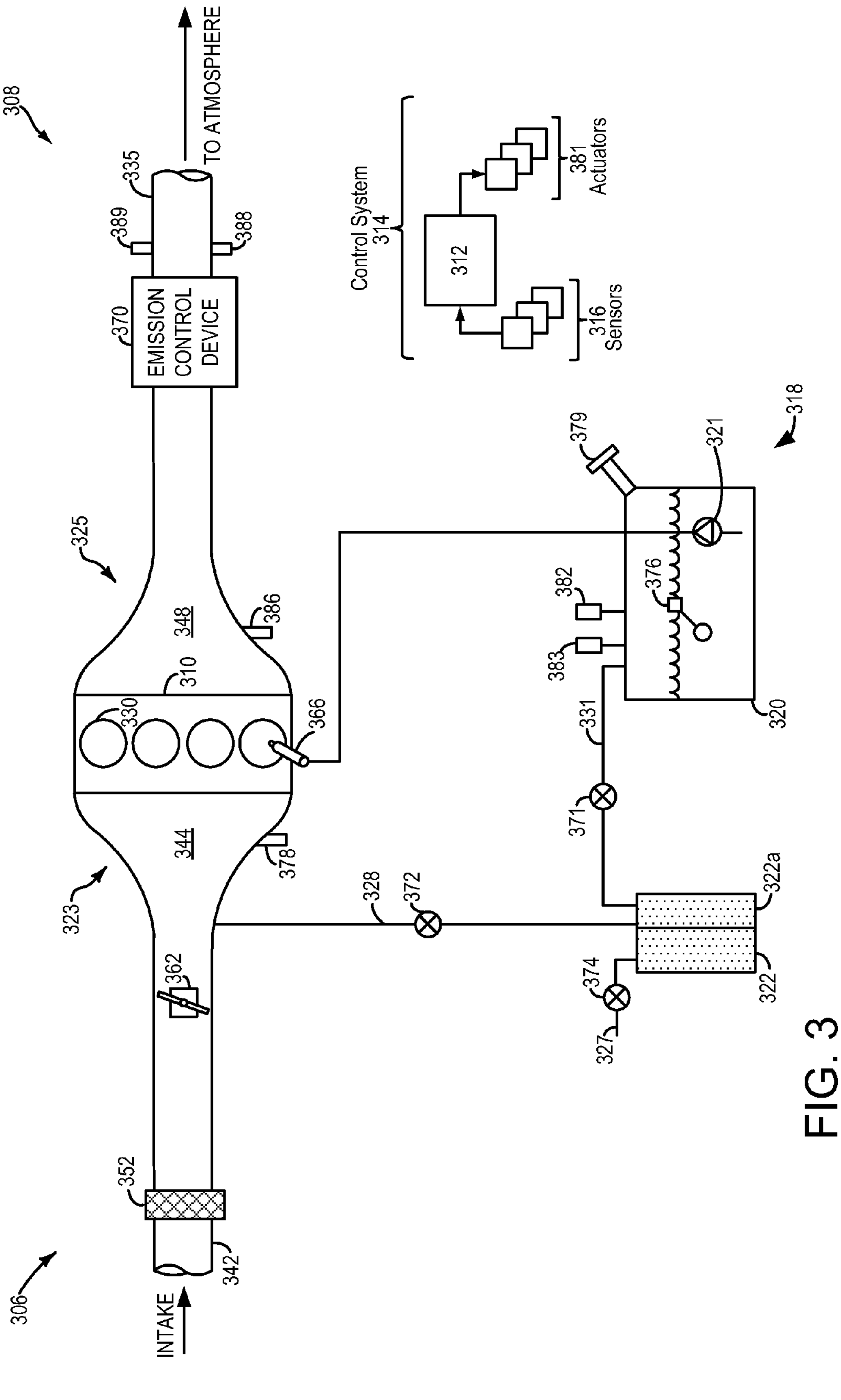
Figure 4:
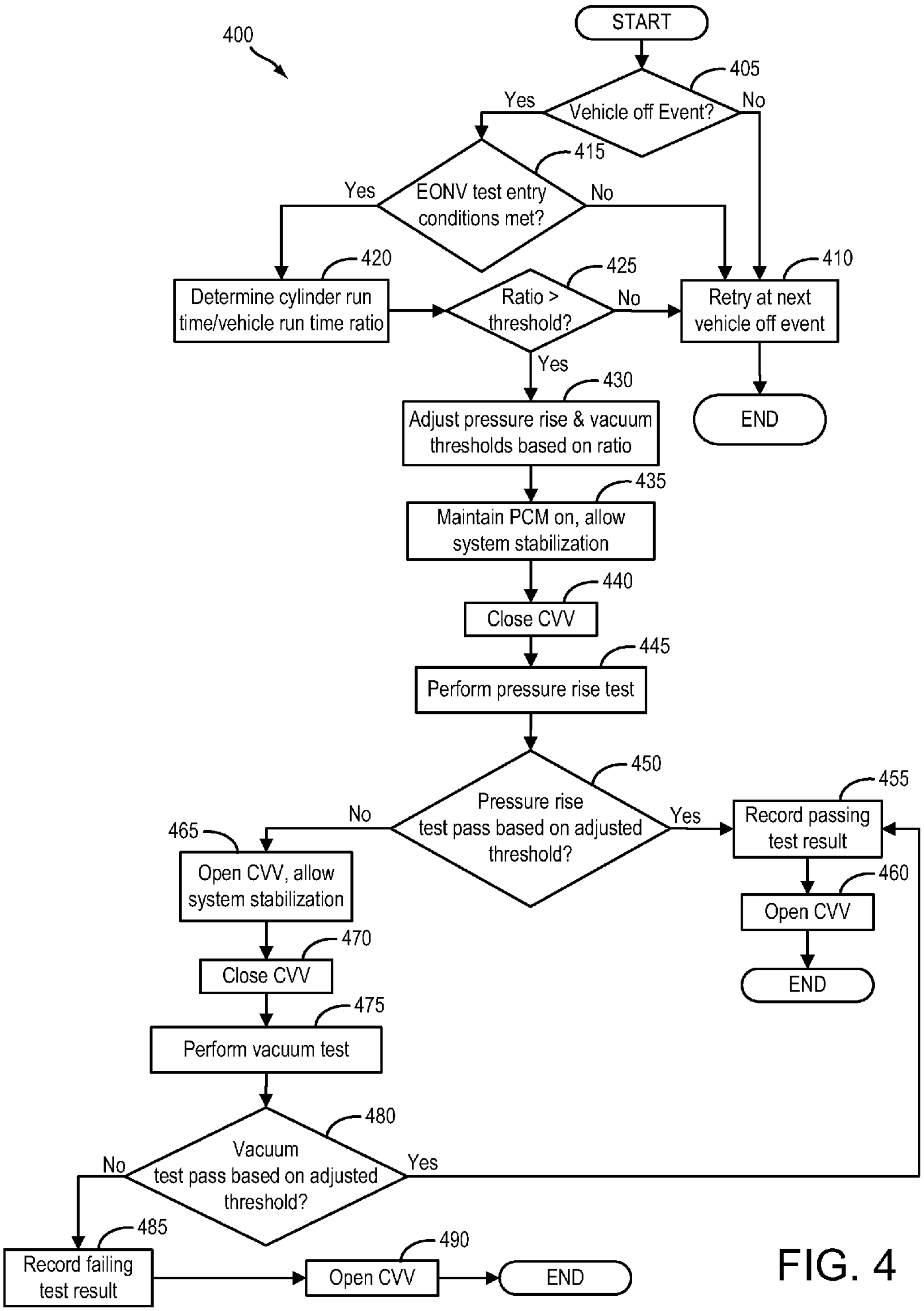
FIG. 4 shows a flow-chart for a high-level method for an engine-off natural vacuum test.

This detailed description relates to systems and methods for performing an engine-off natural vacuum (EONV) leak test for a vehicle fuel system. In particular, the description relates to adjusting testing thresholds and entry conditions of the EONV leak test based on a ratio of cylinder run time to total vehicle run time. The EONV leak test may be applied to vehicles with variable displacement engines (VDEs), such as the VDE depicted in FIG. 1. For a VDE, some cylinders, such as the engine cylinder depicted in FIG. 2, may be deactivated during vehicle operation. As such, the engine may reject less heat to the fuel system than if all engine cylinders were in operation during vehicle operation. An example engine and fuel system is shown in FIG. 3. FIG. 4 shows a high-level flow chart for an example EONV leak test based on the ratio of cylinder run time to total vehicle run time. An example EONV leak test profile is depicted in the timeline shown in FIG. 5.

Figure 1:
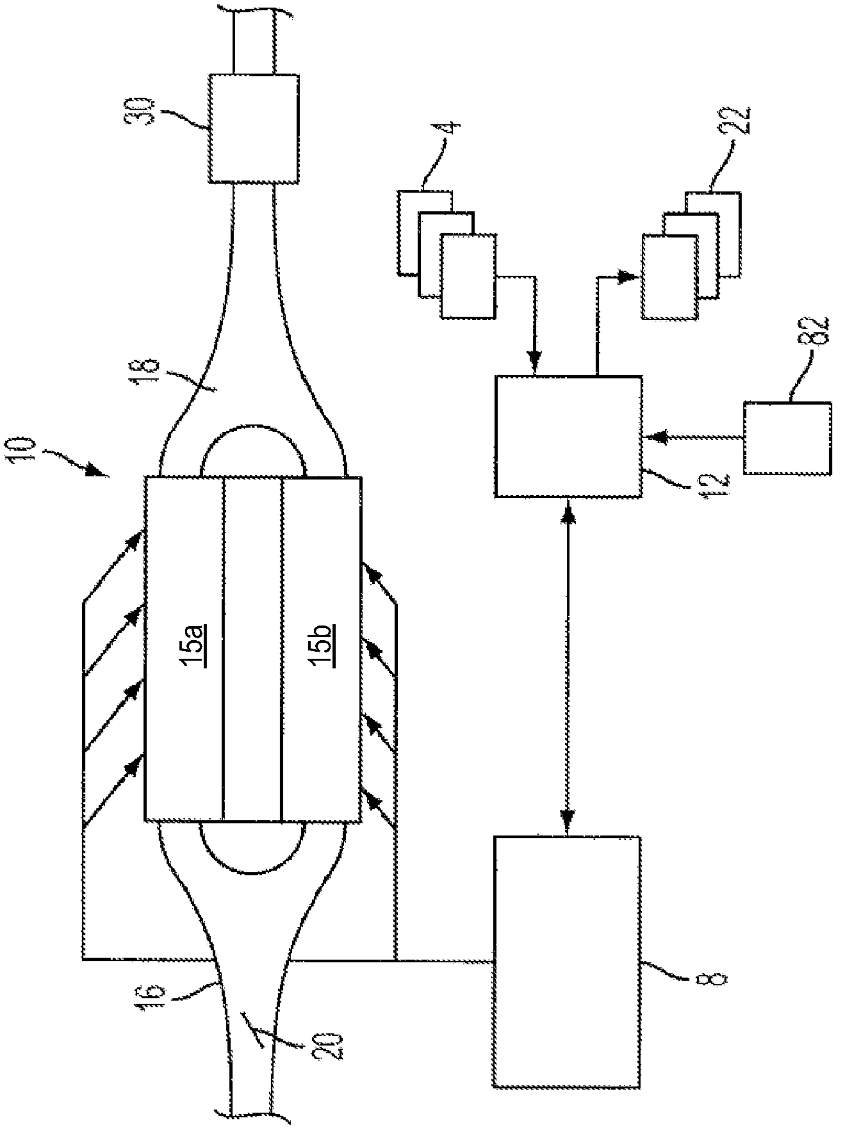

FIG. 1 shows an example variable displacement engine (VDE) 10 having a first bank 15*a* and a second bank 15*b*. In the depicted example, engine 10 is a V8 engine with the first and second banks each having four cylinders. However, in alternate embodiments, the engine may have a different number of engine cylinders, such as 6, 10, 12, etc. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

During selected conditions, such as when the full torque capability of the engine is not needed, one or more cylinders, such as one of a first or second cylinder group, may be selected for deactivation (herein also referred to as a VDE mode of operation). Specifically, one or more cylinders of the selected group of cylinders may be deactivated by shutting off respective fuel injectors while maintaining operation of the intake and exhaust valves such that air may continue to be pumped through the cylinders. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled. This requires higher manifold pressures, resulting in lowered pumping losses and increased engine efficiency. Also, the lower effective surface area (from only the enabled cylinders) exposed to combustion reduces engine heat losses, improving the thermal efficiency of the engine. In alternate examples, engine system 10 may have cylinders with selectively deactivatable intake and/or exhaust valves wherein deactivating the cylinder includes deactivating the intake and/or exhaust valves.

Cylinders may be grouped for deactivation in a bank-specific manner. For example, in FIG. 1, the first group of cylinders may include the four cylinders of the first bank 15*a* while the second group of cylinders may include the four cylinders of the second bank 15*b*. In an alternate example, instead of one or more cylinders from each bank being deactivated together, two cylinders from each bank of the V8 engine may be selectively deactivated together.

Engine 10 may operate on a plurality of substances, which may be delivered via fuel system 8. Engine 10 may be controlled at least partially by a control system including controller 12. Controller 12 may receive various signals from sensors 4 coupled to engine 10, and send control signals to various actuators 22 coupled to the engine and/or vehicle.

Fuel system 8 may be further coupled to a fuel vapor recovery system (not shown) including one or more canisters for storing refueling and diurnal fuel vapors. During selected conditions, one or more valves of the fuel vapor recovery system may be adjusted to purge the stored fuel vapors to the engine intake manifold to improve fuel economy and reduce exhaust emissions. In one example, the purge vapors may be directed near the intake valve of specific cylinders. For example, during a VDE mode of operation, purge vapors may be directed only to the cylinders that are firing. This may be achieved in engines configured with distinct intake manifolds for distinct groups of cylinders. Alternatively, one or more vapor management valves may be controlled to determine which cylinder gets the purge vapors.

Controller 12 may receive an indication of cylinder knock or pre-ignition from one or more knock sensors 82 distributed along the engine block. When included, the plurality of knock sensors may be distributed symmetrically or asymmetrically along the engine block. As such, the one or more knock sensors 82 may be accelerometers, or ionization sensors. Further details of the engine 10 and an example cylinder are described with regard to FIG. 2.

Figure 2:
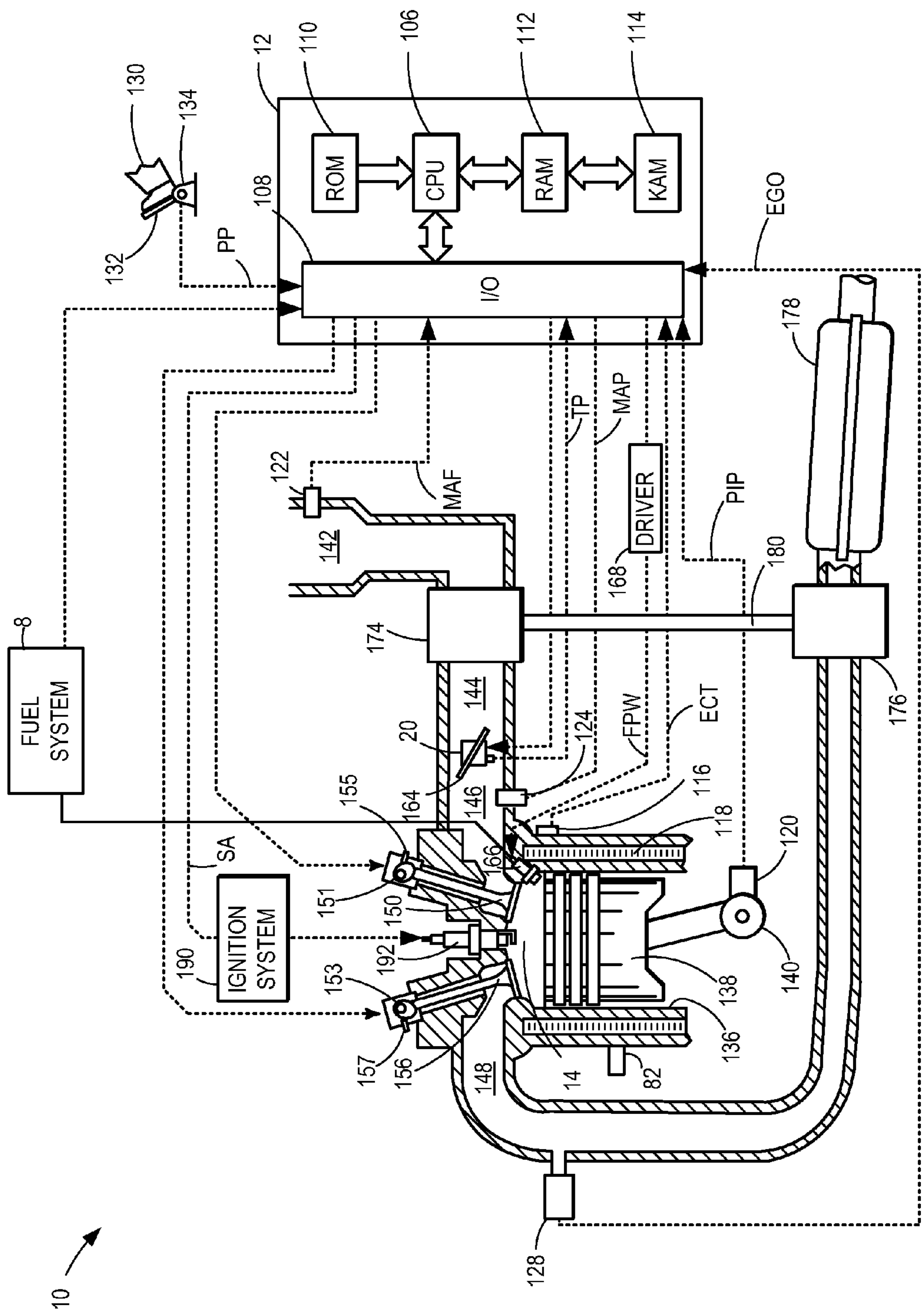

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT, as shown in FIG. 1), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two or more injectors (for example, a direct injector and a port injector, two direct injectors, or two port injectors) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen in the exhaust gas, the sensor may determine the AFR. As such, the AFR may be provided as a Lambda (λ) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 82 coupled to each cylinder 14 for identifying abnormal cylinder combustion events. In alternate embodiments, one or more knock sensors 82 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder. In one example, based on the output of knock sensor 82 in one or more defined windows (e.g., crank angle timing windows), abnormal combustion due to one or more of knock and pre-ignition may be detected and differentiated. As an example, pre-ignition may be indicated in response to knock sensor signals that are generated in an earlier window (e.g., before a cylinder spark event) while knock may be indicated in response to knock sensor signals that are generated in a later window (e.g., after the cylinder spark event). Further, pre-ignition may be indicated in response to knock sensor output signals that are larger (e.g., higher than a first threshold), and/or less frequent while knock may be indicated in response to knock sensor output signals that are smaller (e.g., higher than a second threshold, the second threshold lower than the first threshold) and/or more frequent.

In addition, a mitigating action applied may be adjusted based on whether the abnormal combustion was due to knock or pre-ignition. For example, knock may be addressed using spark retard and EGR while pre-ignition is addressed using cylinder enrichment, cylinder enleanment, engine load limiting, and/or delivery of cooled external EGR.

One or more of fuel injector 166, intake valve 150, and exhaust valve 156 may be selectively deactivatable. As discussed at FIG. 1, during conditions when the full torque capability of the engine is not needed, such as low load conditions, cylinder 14 may be selectively deactivated by disabling cylinder fueling and/or the operation of the cylinder's intake and exhaust valves. As such, remaining cylinders that are not deactivated may continue to operate and the engine may continue to spin. The motoring of the engine may result in vacuum being generated which causes oil from across the piston ring to be drawn into the deactivated cylinder. As such, as the duration of cylinder deactivation extends, the amount of oil accumulated in the cylinder may increase. Oil may also be trapped due to the lower cylinder temperature and pressure during the deactivation. During a subsequent reactivation, the trapped oil may act as an ignition source. The ignition may become an issue in particular if the cylinder is reactivated to high load conditions, such as when the cylinder is reactivated with boost operation enabled. Specifically, the accumulated oil may pre-ignite the cylinder, leading to engine damage. To address this pre-ignition, during reactivation of a VDE cylinder to high cylinder load conditions, the cylinder may be selectively enriched for a duration of the reactivation, as shown at FIG. 3. The enrichment may be adjusted based on factors that affect the amount of oil that accumulates in the cylinder. As elaborated at FIG. 4, the enrichment may be adjusted based on the duration of cylinder operation in the VDE mode, as well as the cylinder load level during the reactivation. The enrichment may be further adjusted in a closed-loop fashion based on actual incidences of pre-ignition (that is, the cylinder's pre-ignition history) so as to better anticipate and address cylinder pre-ignition occurrence. After the temporary enrichment, the cylinder may resume stoichiometric combustion.

Returning to FIG. 1, controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from knock sensor 82 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine is described herein with reference to FIG. 4.

FIG. 3 shows a schematic depiction of a hybrid vehicle system 306 that can derive propulsion power from engine system 308 and/or an on-board energy storage device, such as a battery system. An energy conversion device, such as a generator (not shown), may be operated to absorb energy from vehicle motion and/or engine operation, and then convert the absorbed energy to an energy form suitable for storage by the energy storage device.

Engine system 308 may include an engine 310 having a plurality of cylinders 330. Engine 310 includes an engine intake 323 and an engine exhaust 325. Engine intake 323 includes an air intake throttle 362 fluidly coupled to the engine intake manifold 344 via an intake passage 342. Air may enter intake passage 342 via air filter 352. Engine exhaust 325 includes an exhaust manifold 348 leading to an exhaust passage 335 that routes exhaust gas to the atmosphere. Engine exhaust 325 may include one or more emission control devices 370 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 308 is a boosted engine system, the engine system may further include a boosting device, such as a turbocharger (not shown).

Engine system 308 is coupled to a fuel system 318. Fuel system 318 includes a fuel tank 320 coupled to a fuel pump 321 and a fuel vapor canister 322. During a fuel tank refueling event, fuel may be pumped into the vehicle from an external source through refueling port 379. Fuel tank 320 may hold a plurality of fuel blends, including fuel with a range of alcohol concentrations, such as various gasoline-ethanol blends, including E10, E85, gasoline, etc., and combinations thereof. A fuel level sensor 376 located in fuel tank 320 may provide an indication of the fuel level ("Fuel Level Input") to controller 312. As depicted, fuel level sensor 376 may comprise a float connected to a variable resistor. Alternatively, other types of fuel level sensors may be used.

Fuel pump 321 is configured to pressurize fuel delivered to the injectors of engine 310, such as example injector 366. While only a single injector 366 is shown, additional injectors are provided for each cylinder. It will be appreciated that fuel system 318 may be a return-less fuel system, a return fuel system, or various other types of fuel system. Vapors generated in fuel tank 320 may be routed to fuel vapor canister 322, via conduit 331, before being purged to the engine intake 323.

Fuel vapor canister 322 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 322 may be purged to engine intake 323 by opening canister purge valve 372. While a single canister 322 is shown, it will be appreciated that fuel system 318 may include any number of canisters. In one example, canister purge valve 372 may be a solenoid valve wherein opening or closing of the valve is performed via actuation of a canister purge solenoid.

Canister 322 may include a buffer 322*a* (or buffer region), each of the canister and the buffer comprising the adsorbent. As shown, the volume of buffer 322*a* may be smaller than (e.g., a fraction of) the volume of canister 322. The adsorbent in the buffer 322*a* may be same as, or different from, the adsorbent in the canister (e.g., both may include charcoal). Buffer 322*a* may be positioned within canister 322 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 322 includes a vent 327 for routing gases out of the canister 322 to the atmosphere when storing, or trapping, fuel vapors from fuel tank 320. Vent 327 may also allow fresh air to be drawn into fuel vapor canister 322 when purging stored fuel vapors to engine intake 323 via purge line 328 and purge valve 372. While this example shows vent 327 communicating with fresh, unheated air, various modifications may also be used. Vent 327 may include a canister vent valve 374 to adjust a flow of air and vapors between canister 322 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 374 may be a solenoid valve wherein opening or closing of the valve is performed via actuation of a canister vent solenoid. In particular, the canister vent valve may be an open that is closed upon actuation of the canister vent solenoid.

As such, hybrid vehicle system 306 may have reduced engine operation times due to the vehicle being powered by engine system 308 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 371 may be optionally included in conduit 331 such that fuel tank 320 is coupled to canister 322 via the valve. During regular engine operation, isolation valve 371 may be kept closed to limit the amount of diurnal or "running loss" vapors directed to canister 322 from fuel tank 320. During refueling operations, and selected purging conditions, isolation valve 371 may be temporarily opened, e.g., for a duration, to direct fuel vapors from the fuel tank 320 to canister 322. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 371 positioned along conduit 331, in alternate embodiments, the isolation valve may be mounted on fuel tank 320.

One or more pressure sensors 382 may be coupled to fuel system 318 for providing an estimate of a fuel system pressure. In one example, the fuel system pressure is a fuel tank pressure, wherein pressure sensor 382 is a fuel tank pressure sensor coupled to fuel tank 320 for estimating a fuel tank pressure or vacuum level. While the depicted example shows pressure sensor 382 directly coupled to fuel tank 320, in alternate embodiments, the pressure sensor may be coupled between the fuel tank and canister 322, specifically between the fuel tank and isolation valve 371. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 383 may also be coupled to fuel system 318 for providing an estimate of a fuel system temperature. In one example, the fuel system temperature is a fuel tank temperature, wherein temperature sensor 383 is a fuel tank temperature sensor coupled to fuel tank 320 for estimating a fuel tank temperature. While the depicted example shows temperature sensor 383 directly coupled to fuel tank 320, in alternate embodiments, the temperature sensor may be coupled between the fuel tank and canister 322.

Fuel vapors released from canister 322, for example during a purging operation, may be directed into engine intake manifold 344 via purge line 328. The flow of vapors along purge line 328 may be regulated by canister purge valve 372, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 312, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 328 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 378 coupled to intake manifold 344, and communicated with controller 312. Alternatively, MAP may be inferred from alternate engine operating conditions, such as mass air flow (MAF), as measured by a MAF sensor (not shown) coupled to the intake manifold.

Fuel system 318 may be operated by controller 312 in a plurality of modes by selective adjustment of the various valves and solenoids. For example, the fuel system may be operated in a fuel vapor storage mode (e.g., during a fuel tank refueling operation and with the engine not running), wherein the controller 312 may open isolation valve 371 and canister vent valve 374 while closing canister purge valve (CPV) 372 to direct refueling vapors into canister 322 while preventing fuel vapors from being directed into the intake manifold.

As another example, the fuel system may be operated in a refueling mode (e.g., when fuel tank refueling is requested by a vehicle operator), wherein the controller 312 may open isolation valve 371 and canister vent valve 374, while maintaining canister purge valve 372 closed, to depressurize the fuel tank before allowing enabling fuel to be added therein. As such, isolation valve 371 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 312 may open canister purge valve 372 and canister vent valve while closing isolation valve 371. Herein, the vacuum generated by the intake manifold of the operating engine may be used to draw fresh air through vent 327 and through fuel vapor canister 322 to purge the stored fuel vapors into intake manifold 344. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 322 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 306 may further include control system 314. Control system 314 is shown receiving information from a plurality of sensors 316 (various examples of which are described herein) and sending control signals to a plurality of actuators 381 (various examples of which are described herein). As one example, sensors 316 may include exhaust gas sensor 386 located upstream of the emission control device, temperature sensor 388, MAP sensor 378, pressure sensor 382, and pressure sensor 389. Other sensors such as additional pressure, temperature, air/fuel ratio, and composition sensors may be coupled to various locations in the vehicle system 306. As another example, the actuators may include fuel injector 366, isolation valve 371, purge valve 372, vent valve 374, fuel pump 321, and throttle 362.

Control system 314 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 314 may further be configured to receive information via the internet or other communication networks. Information received from the GPS may be cross-referenced to information available via the internet to determine local weather conditions, local vehicle regulations, etc. Control system 314 may use the internet to obtain updated software modules which may be stored in non-transitory memory.

The control system 314 may include a controller 312. Controller 312 may be configured as a conventional microcomputer including a microprocessor unit, input/output ports, read-only memory, random access memory, keep alive memory, a controller area network (CAN) bus, etc. Controller 312 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. An example control routine is described herein and with regard to FIG. 4.

Controller 312 may also be configured to intermittently perform leak detection routines on fuel system 318 (e.g., fuel vapor recovery system) to confirm that the fuel system is not degraded. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Leak tests performed while the engine is not running may include sealing the fuel system following engine shut-off and monitoring a change in fuel tank pressure. This type of leak test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values that would occur for a system with no leaks, and/or for a system with leaks of a predetermined size. Following a vehicle-off event, as heat continues to be rejected from the engine into the fuel tank, the fuel tank pressure will initially rise. During conditions of relatively high ambient temperature, a pressure build above a threshold may be considered a passing test.

EONV tests are typically initiated based on an inferred amount of heat rejected into the fuel tank. The amount of heat rejected may be inferred based on engine temperature, driving distance, total air mass entering the engine, etc. However, engines capable of operating in a deceleration fuel shut off mode may meet distance and/or air mass thresholds for initiating the EONV test while failing to generate and reject enough heat to robustly execute the test. Further, variable displacement engines may generate less heat than an engine operating with all cylinders constantly active. For VDEs, inferring the amount of heat rejected using the same standards for full displacement engines may lead to false failures, as the fuel tank pressure/vacuum thresholds may not be reached during the testing durations.

FIG. 4 depicts a high-level method 400 for an engine-off natural vacuum test for a vehicle comprising a variable displacement engine or a vehicle configured to run in a deceleration fuel shut off mode. Method 400 will be described with relation to the systems depicted in FIGS. 1-3, but it should be understood that similar methods may be used with other systems without departing from the scope of this disclosure. Method 400 may be carried out by a controller, such as controller 312, and may be stored as executable instructions in non-transitory memory.

Method 400 may begin at 405. At 405, method 400 may include determining whether a vehicle-off event has occurred. The vehicle-off event may include an engine-off event, and may be indicated by other events, such as a key-off event. The vehicle off event may follow a vehicle run time duration, the vehicle run time duration commencing at a previous vehicle-on event. If no vehicle-off event is detected, method 400 may proceed to 410. At 410, method 400 may include recording that an EONV test was not executed, and may further include setting a flag to retry the EONV test at the next detected vehicle-off event. Method 400 may then end.

If a vehicle-off event is detected, method 400 may proceed to 415. At 415, method 400 may include determining whether entry conditions for an EONV test are met. For an engine-off natural vacuum test, the engine must be at rest with all cylinders off, as opposed to engine operation with the engine rotating, even if one or more cylinders are deactivated. Further entry conditions may include a threshold amount of time passed since the previous EONV test, a threshold length of engine run time prior to the engine-off event, a threshold amount of fuel in the fuel tank, and a threshold battery state of charge. If entry conditions are not met, method 400 may proceed to 410. At 410, method 400 may include recording that an EONV test was not executed, and may further include setting a flag to retry the EONV test at the next detected vehicle-off event. Method 400 may then end.

Although entry conditions may be met at the initiation of method 400, conditions may change during the execution of the method. For example, an engine restart or refueling event may be sufficient to abort the method at any point prior to completing method 400. If such events are detected that would interfere with the performing of method 400 or the interpretation of results derived from executing method 400, method 400 may proceed to 410, record that an EONV test was aborted, and set a flag to retry the EONV test at the next detected vehicle-off event, and then end.

If entry conditions are met, method 400 may proceed to 420. At 420, method 400 may include determining a ratio of cylinder run time to vehicle run time for the vehicle run time duration preceding the most recent vehicle-off event. The ratio of cylinder run time to vehicle run time may be monitored and stored during the preceding vehicle run time and retrieved by the controller, or the engine operating conditions may be stored during the vehicle run time and the ratio of cylinder run time to vehicle run time may be determined based on the stored operating conditions. The run time for a deactivatable cylinder may exclude vehicle run time when the deactivatable cylinder is deactivated. The ratio of cylinder run time to vehicle run time may be based on an average number of cylinders active during a vehicle run time duration. The ratio of cylinder run time to vehicle run time may indicate an relative amount of work done by the engine, and further may indicate a relative amount of heat generated by the engine that may be rejected to the fuel tank. In this way, the controller may assess an expected change in fuel tank temperature, and in turn, determine parameters for EONV testing.

For example, a ratio may be determined using the following equation:

$$\text{Ratio}=\Sigma[(\text{combusting cylinders})/(\text{total cylinders})*\text{Unit Time}]/\text{Total Vehicle Run Time}$$

For example, if all engine cylinders were combusting for the entire vehicle run time, the ratio will be equal to 1. If an average of half of the engine cylinders were combusting during the vehicle run time, the ratio will be equal to 0.5. If the vehicle was operating in deceleration fuel shut off (DFSO) mode for the entire vehicle run time (e.g. an exclusively downhill trip), the ratio will be equal to 0.

When a ratio has been determined, method 400 may proceed to 425. At 425, method 400 may include determining whether the ratio is greater than a threshold. For example, if the ratio is equal to 0, the engine will not have combusted during the vehicle run time, and thus not have rejected heat to the fuel tank. This would not meet the entry conditions for an EONV test. The threshold ratio may be predetermined (e.g. 0.1) or may be based on operating and ambient conditions. The threshold may be set at a value indicative that an EONV test is likely (e.g. above a threshold likelihood) to run to completion and provide an accurate pass/fail result. If the determined ratio is less than the threshold, method 400 may proceed to 410. At 410, method 400 may include recording that an EONV test was aborted, and setting a flag to retry the EONV test at the next detected vehicle-off event. Method 400 may then end.

If the determined ratio is greater than the threshold, method 400 may proceed to 430. At 430, method 400 may include adjusting pressure rise and vacuum thresholds based on the ratio. The threshold pressure may be based on the current conditions, including the ambient temperature, the fuel level, the fuel volatility, etc. The threshold pressure may further be based on an inferred amount of heat rejection from the engine to the fuel tank. As such, the ratio of cylinder run time to vehicle run time may be used to adjust the inferred amount of heat rejection, and thus determine pressure rise and vacuum thresholds that would be indicative of fuel system degradation. An initial value for the pressure rise and vacuum thresholds may be determined based on a vehicle trip with full cylinder activation (e.g. ratio=1). The thresholds may then be reduced proportionate to the determined cylinder run time ratio. Accordingly, if the ratio is relatively low, the thresholds may be reduced to relatively low values. If the ratio is relatively high, the thresholds may be reduced slightly. If the ratio is 1, the thresholds may not be adjusted based on cylinder run time or the determined ratio. In some examples, the pressure rise and vacuum portions of the EONV test may be based on a rate of pressure change. In those examples, the rates of pressure change may be adjusted based on the determined cylinder run time ratio. Additionally or alternatively, for some evaporative emissions leak tests, a leak test parameter may be adjusted based on the ratio of cylinder run time of a deactivatable cylinder of an engine, to vehicle run time.

Continuing at 435, method 400 may include maintaining the PCM on despite the engine-off and/or vehicle off condition. In this way, the method may continue to be carried out by a controller, such as controller 312. Method 400 may further include allowing the fuel system to stabilize following the engine-off condition. Allowing the fuel system to stabilize may include waiting for a period of time before method 400 advances. The stabilization period may be a predetermined amount of time, or may be an amount of time based on current operating conditions. The stabilization period may be based on the predicted ambient conditions. In some examples, the stabilization period may be characterized as the length of time necessary for consecutive measurements of a parameter to be within a threshold of each other. For example, fuel may be returned to the fuel tank from other fuel system components following an engine off condition. The stabilization period may thus end when two or more consecutive fuel level measurements are within a threshold amount of each other, signifying that the fuel level in the fuel tank has reached a steady-state. In some examples, the stabilization period may end when the fuel tank pressure is equal to atmospheric pressure. Following the stabilization period, method 400 may proceed to 440.

At 440, method 400 may include closing a canister vent valve (CVV). Additionally or alternatively, a fuel tank isolation valve (FTIV) may be closed where included in the fuel system. In this way, the fuel tank may be isolated from atmosphere. The status of a canister purge valve (CPV) and/or other valves coupled within a conduit connecting the fuel tank to atmosphere may also be assessed and closed if open. Method 400 may then proceed to 445.

At 445, method 400 may include performing a pressure rise test. While the engine is still cooling down post shutdown, there may be additional heat rejected to the fuel tank. With the fuel system sealed via the closing of the CVV, the pressure in the fuel tank may rise due to fuel volatizing with increased temperature. The pressure rise test may include monitoring fuel tank pressure for a period of time. Fuel tank pressure may be monitored until the pressure reaches the adjusted threshold, the adjusted threshold pressure indicative of no leaks above a threshold size in the fuel tank. In some examples, the rate of pressure change may be compared to an expected rate of pressure change. The fuel tank pressure may not reach the threshold pressure. Rather the fuel tank pressure may be monitored for a predetermined amount of time, or an amount of time based on the current conditions. The fuel tank pressure may be monitored until consecutive measurements are within a threshold amount of each other, or until a pressure measurement is less than the previous pressure measurement. The fuel tank pressure may be monitored until the fuel tank temperature stabilizes. Method 400 may then proceed to 450.

At 450, method 400 may include determining whether the pressure rise test ended due to a passing result, such as the fuel tank pressure reaching the adjusted pressure threshold. If the pressure rise test resulted in a passing result, method 400 may proceed to 455. At 455, method 400 may include recording the passing test result. Continuing at 460, method 400 may include opening the canister vent valve. In this way, the fuel system pressure may be returned to atmospheric pressure. Method 400 may then end.

If the pressure rise test did not result in a pass based on the adjusted threshold, method 400 may proceed to 465. At 465, method 400 may include opening the CVV and allowing the system to stabilize. Opening the CVV allows the fuel system pressure to equilibrate to atmospheric pressure. The system may be allowed to stabilize until the fuel tank pressure reaches atmospheric pressure, and/or until consecutive pressure readings are within a threshold of each other. Method 400 may then proceed to 470.

At 470, method 400 may include closing the CVV. In this way, the fuel tank may be isolated from atmosphere. As the fuel tank cools, the fuel vapors should condense into liquid fuel, creating a vacuum within the sealed tank. Continuing at 475, method 400 may include performing a vacuum test. Performing a vacuum test may include monitoring fuel tank pressure for a duration. Fuel tank pressure may be monitored until the vacuum reaches the adjusted threshold, the adjusted threshold vacuum indicative of no leaks above a threshold size in the fuel tank. In some examples, the rate of pressure change may be compared to an expected rate of pressure change. The fuel tank pressure may not reach the threshold vacuum. Rather the fuel tank pressure may be monitored for a predetermined duration, or a duration based on the current conditions.

Continuing at 480, method 400 may include determining whether a passing result was indicated for the vacuum test based on the adjusted threshold. If the vacuum test resulted in a passing result, method 400 may proceed to 455. At 455, method 400 may include recording the passing test result. Continuing at 460, method 400 may include opening the canister vent valve. In this way, the fuel system pressure may be equilibrated to atmospheric pressure. Method 400 may then end. If a failing test result was indicated, method 400 may proceed to 485. At 485, method 400 may include recording the failing test result. Continuing at 490, method 400 may include opening the canister vent valve. In this way, the fuel system pressure may be equilibrated to atmospheric pressure. Method 400 may then end.

Figure 5:
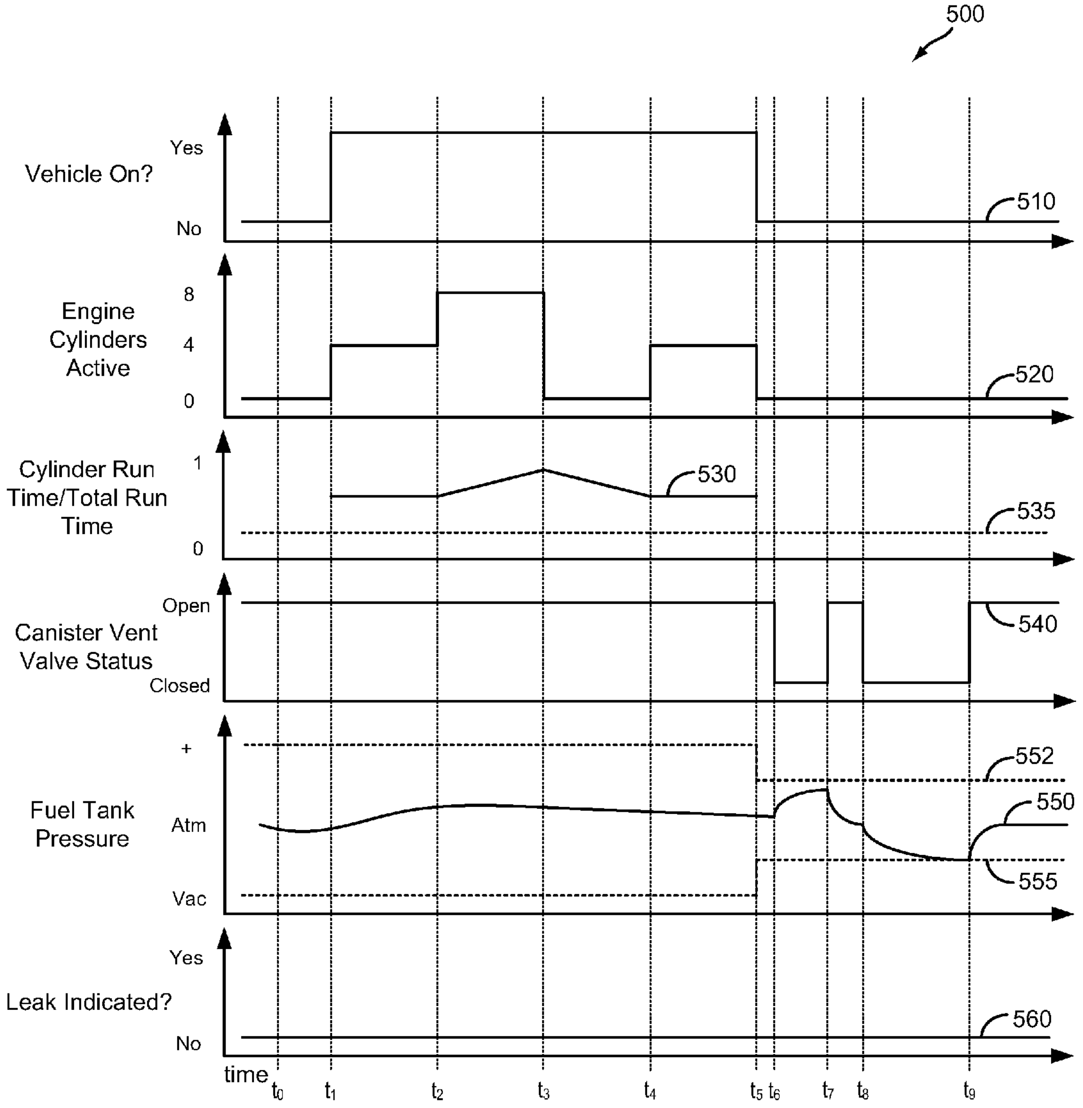
FIG. 5 shows an example timeline for an engine-off natural vacuum test.

FIG. 5 shows a timeline 500 for an example evaporative emissions test using the method of FIG. 4 applied to the systems of FIGS. 1-3. Timeline 500 includes plot 510, indicating an vehicle-on status over time, and plot 520, indicating a number of engine cylinders active over time. Timeline 500 further includes plot 530, indicating a ratio of cylinder run time to total vehicle run time. Line 535 represents a threshold cylinder run time ratio for initiating an engine-off natural vacuum leak test. Timeline 500 further includes plot 540, indicating a canister vent valve status over time, and plot 550, indicating a fuel tank pressure over time. Line 552 represents a pressure threshold for the pressure rise portion of an EONV test. Line 555 represents a vacuum threshold for the vacuum portion of an EONV test. Timeline 500 further includes plot 560, indicating whether an evaporative emissions leak is indicated over time.

At time $t_0$, the vehicle is off, as indicated by plot 510. Accordingly, no engine cylinders are active, as indicated by plot 520, and the canister vent valve is open, as indicated by plot 540. At time $t_1$, the vehicle is turned on. As indicated by plot 520, 4 of 8 engine cylinders are active from time $t_1$ to time $t_2$. Accordingly, the ratio of cylinder unit time to total run time is equal to 0.5. The canister vent valve is maintained open while the vehicle is on.

From time $t_2$ to time $t_3$, the vehicle operates with 8 of 8 engine cylinders active. Accordingly, the ratio of cylinder unit time to total run time increases, reaching 0.67 at time $t_3$. From time $t_3$ to time $t_4$, the vehicle operates in deceleration fuel shut off mode with 0 of 8 cylinders active. Accordingly, the ratio of cylinder unit time to total run time decreases, reaching 0.5 at time $t_4$. From time $t_4$ to time $t_5$, the vehicle operates with 4 of 8 engine cylinders active. Accordingly, the ratio of cylinder unit time to total run time is maintained at 0.5 during this time period.

At time $t_5$, the vehicle is turned off, and all engine cylinders are deactivated. The ratio of cylinder run time to vehicle run time is greater than the threshold for EONV entry, as indicated by line 535. Accordingly, the pressure rise threshold represented by line 552 and the vacuum threshold represented by line 555 are adjusted to reflect the ratio of cylinder run time to vehicle run time. The canister vent valve is left open from time $t_5$ to time $t_6$ to allow system stabilization.

At time $t_6$, the canister vent valve is closed, and the pressure rise portion of the EONV test begins. The fuel tank pressure increases from time $t_6$ to time $t_7$, as indicated by plot 550. At time t7, the time limit for the pressure rise test is reached. The fuel tank pressure is less than the adjusted pressure rise threshold represented by line 552, but no leak is indicated, as indicated by plot 560. From time $t_7$ to time $t_8$, the canister vent valve is opened, allowing for the fuel tank pressure to equilibrate to atmospheric pressure. At time $t_8$, the canister vent valve is again closed, allowing for the vacuum portion of the EONV test to commence. The fuel tank pressure decreases from time $t_8$ to time $t_9$, as cooling fuel condenses, forming a vacuum in the sealed system. At time $t_9$, the fuel tank pressure reaches the adjusted threshold represented by line 555. Accordingly, no leak is indicated. The canister vent valve is re-opened, allowing the fuel tank pressure to return to atmospheric pressure.

The method described herein and depicted in FIG. 4, along with the systems described herein and depicted in FIGS. 1-3 may enable one or more systems and one or more methods. In one example, a method, comprising: adjusting an evaporative emissions leak test parameter based on a ratio of cylinder run time of a deactivatable cylinder of an engine, to vehicle run time; and indicating degradation based on the adjusted parameter. The ratio of cylinder run time to vehicle run time may be based on an average number of cylinders active during a vehicle run time duration. Cylinder run time may exclude vehicle run time when the deactivatable cylinder is deactivated. The vehicle run time duration may be a total vehicle run time between a most recent vehicle-off event and a previous vehicle-on event. The evaporative emissions leak test may be an engine-off natural vacuum test. The evaporative emissions leak test parameter may thus be a pressure rise threshold for the engine-off natural vacuum test, and/or may be a vacuum threshold for the engine-off natural vacuum test. The engine may be configured as a variable displacement engine. In some examples, the engine may be configured to operate in a deceleration fuel shut off mode. The method may further comprise: initiating the evaporative emissions leak test only when the ratio of cylinder run time to vehicle run time is greater than a threshold. In some examples, the evaporative emissions leak test parameter may be adjusted proportionate to the ratio of cylinder run time to vehicle run time. The technical result of implementing this method is an increase in overall EONV test performance metrics, as the entry conditions and testing parameters may be adjusted based on engine and cylinder use. In this way, warranty costs to the manufacturer may be reduced.

In another example, a vehicle system, comprising: an engine comprising one or more selectively operable cylinders; a fuel system isolatable from atmosphere via one or more valves; and a controller configured with instructions stored in non-transitory memory, that when executed, cause the controller to: adjust one or more thresholds for an engine-off natural vacuum test based on a ratio of cylinder run time to total vehicle run time; following a vehicle-off event, isolate the fuel system from atmosphere; and indicate degradation of the fuel system based on the one or more adjusted thresholds. The one or more thresholds may include a pressure rise threshold, and the controller may be configured with instructions stored in non-transitory memory, that when executed, cause the controller to: monitor a fuel tank pressure for a first testing duration; and responsive to a fuel tank pressure reaching the adjusted pressure rise threshold during the first testing duration, indicate that the fuel system is intact. The one or more thresholds may include a vacuum threshold, and the controller may be configured with instructions stored in non-transitory memory, that when executed, cause the controller to: responsive to a fuel tank pressure failing to reach the adjusted pressure rise threshold during the first testing duration, coupling the fuel system to atmosphere; responsive to the fuel tank pressure decreasing to atmospheric pressure, isolating the fuel system from atmosphere; monitor a fuel tank vacuum for a second testing duration; and responsive to a fuel tank vacuum reaching the adjusted vacuum threshold during the second testing duration, indicate that the fuel system is intact. The ratio of cylinder run time to total vehicle run time may be based on an average number of cylinders active during a total vehicle run time duration. The engine may be configured as a variable displacement engine. In some examples, the engine may be configured to operate in a deceleration fuel shut off mode. The controller may further configured with instructions stored in non-transitory memory, that when executed, cause the controller to: following a vehicle-off event, isolate the fuel system from atmosphere responsive to the ratio of cylinder run time to total vehicle run time being greater than an initiation threshold. The one or more thresholds may be adjusted proportionate to the ratio of cylinder run time to total vehicle run time. The technical result of implementing this system is a reduction in false failures of the EONV test. By adjusting thresholds for an engine-off natural vacuum test, the expected changes in fuel tank temperature and pressure may more accurately reflect the state of the engine and an expected amount of heat rejected to the fuel tank. Thus, the test will not expect dramatic changes in fuel tank pressure when only a modest amount of heat has been generated by the engine during the vehicle run time.

In yet another example, a method for a vehicle fuel system, comprising: adjusting a pressure rise threshold and a vacuum threshold for an engine-off natural vacuum test based on a ratio of cylinder run time to total vehicle run time; following a vehicle-off event, closing a canister vent valve responsive to the ratio of cylinder run time to total vehicle run time being greater than an initiation threshold; monitoring a fuel tank pressure for a first testing duration; responsive to a fuel tank pressure reaching the adjusted pressure rise threshold during the first testing duration, indicating that the vehicle fuel system is intact; responsive to a fuel tank pressure failing to reach the adjusted pressure rise threshold during the first testing duration, coupling the vehicle fuel system to atmosphere; responsive to the fuel tank pressure decreasing to atmospheric pressure, isolating the vehicle fuel system from atmosphere; monitor a fuel tank vacuum for a second testing duration; responsive to a fuel tank vacuum reaching the adjusted vacuum threshold during the second testing duration, indicate that the vehicle fuel system is intact; and indicating degradation of the vehicle fuel system responsive to the fuel tank vacuum failing to reach the adjusted vacuum threshold during the second testing duration. The technical result of implementing this method is an increase in execution rate for the EONV test. If the test parameters are assumed based solely on engine run time or total intake air, the amount of heat rejected to the fuel tank may be overestimated if the engine was operating with one or more cylinders deactivated. By compensating for cylinder run time, the test will only initiate when conditions favor the test running to completion.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

adjusting an evaporative emissions leak test parameter based on a ratio of cylinder run time of a deactivatable cylinder of an engine to total vehicle run time; and indicating degradation based on the adjusted parameter, wherein the degradation is a leak of a fuel system.

2. The method of claim 1, where cylinder run time of the deactivatable cylinder of the engine excludes vehicle run time when the deactivatable cylinder is deactivated.

3. The method of claim 1, where the engine is configured as a variable displacement engine.

4. The method of claim 1, where the engine is configured to operate in a deceleration fuel shut off mode.

5. The method of claim 1, further comprising:

initiating the evaporative emissions leak test only when the ratio of cylinder run time of the deactivatable cylinder of the engine to total vehicle run time is greater than a threshold.

6. The method of claim 1, where the evaporative emissions leak test parameter is adjusted proportionate to the ratio of cylinder run time of the deactivatable cylinder of the engine to total vehicle run time.

7. The method of claim 1, where the ratio of cylinder run time of the deactivatable cylinder of the engine to total vehicle run time is based on an average number of cylinders active during a vehicle run time duration.

8. The method of claim 7, where the total vehicle run time duration is a vehicle run time between a most recent vehicle-off event and a previous vehicle-on event.

9. The method of claim 1, where the evaporative emissions leak test is an engine-off natural vacuum test.

10. The method of claim 9, where the evaporative emissions leak test parameter is a pressure rise threshold for the engine-off natural vacuum test.

11. The method of claim 9, where the evaporative emissions leak test parameter is a vacuum threshold for the engine-off natural vacuum test.

12. A vehicle system, comprising:

an engine comprising one or more selectively operable cylinders;

a fuel system isolatable from atmosphere via one or more valves; and a controller configured with instructions stored in non-transitory memory, that when executed, cause the controller to:

adjust one or more thresholds for an engine-off natural vacuum test based on a ratio of cylinder run time of a deactivatable cylinder of the engine to total vehicle run time;

following a vehicle-off event, isolate the fuel system from atmosphere; and indicate degradation of the fuel system based on the one or more adjusted thresholds, wherein the degradation is a leak of the fuel system.

13. The vehicle system of claim 12, where the controller is further configured with instructions stored in non-transitory memory, that when executed, cause the controller to:

following a vehicle-off event, isolate the fuel system from atmosphere responsive to the ratio of cylinder run time of the deactivatable cylinder of the engine to total vehicle run time being greater than an initiation threshold.

14. The vehicle system of claim 12, where the one or more thresholds are adjusted proportionate to the ratio of cylinder run time to total vehicle run time.

15. The vehicle system of claim 12, where the one or more thresholds include a pressure rise threshold, and where the controller is configured with instructions stored in non-transitory memory, that when executed, cause the controller to:

monitor a fuel tank pressure for a first testing duration; and responsive to a fuel tank pressure reaching the adjusted pressure rise threshold during the first testing duration, indicate that the fuel system is intact.

16. The vehicle system of claim 15, where the one or more thresholds include a vacuum threshold, and where the controller is configured with instructions stored in non-transitory memory, that when executed, cause the controller to:

responsive to a fuel tank pressure failing to reach the adjusted pressure rise threshold during the first testing duration, coupling the fuel system to atmosphere;

responsive to the fuel tank pressure decreasing to atmospheric pressure, isolating the fuel system from atmosphere;

monitor a fuel tank vacuum for a second testing duration; and responsive to a fuel tank vacuum reaching the adjusted vacuum threshold during the second testing duration, indicate that the fuel system is intact.

17. The vehicle system of claim 12, where the ratio of cylinder run time of the deactivatable cylinder of the engine to total vehicle run time is based on an average number of cylinders active during a total vehicle run time duration.

18. The vehicle system of claim 17, where the engine is configured as a variable displacement engine.

19. The vehicle system of claim 17, where the engine is configured to operate in a deceleration fuel shut off mode.

20. A method for a vehicle fuel system, comprising:

adjusting a pressure rise threshold and a vacuum threshold for an engine-off natural vacuum test based on a ratio of cylinder run time of a deactivatable cylinder of the engine to total vehicle run time;

following a vehicle-off event, closing a canister vent valve responsive to the ratio of cylinder run time of the deactivatable cylinder of the engine to total vehicle run time being greater than an initiation threshold;

monitoring a fuel tank pressure for a first testing duration;

responsive to a fuel tank pressure reaching the adjusted pressure rise threshold during the first testing duration, indicating that the vehicle fuel system is intact;

responsive to a fuel tank pressure failing to reach the adjusted pressure rise threshold during the first testing duration, coupling the vehicle fuel system to atmosphere;

responsive to the fuel tank pressure decreasing to atmospheric pressure, isolating the vehicle fuel system from atmosphere;

monitor a fuel tank vacuum for a second testing duration;

responsive to a fuel tank vacuum reaching the adjusted vacuum threshold during the second testing duration, indicating that the vehicle fuel system is intact; and indicating degradation of the vehicle fuel system responsive to the fuel tank vacuum failing to reach the adjusted vacuum threshold during the second testing duration, wherein the degradation is a leak of the vehicle fuel system.

* * * * *